United States Patent
Sundberg

(10) Patent No.: US 8,776,467 B2
(45) Date of Patent: Jul. 15, 2014

(54) CLIMATE POSITIVE BUILDING ENVELOPE FOR HOUSING

(76) Inventor: Per Gösta Sundberg, Stockholm (SE)

(*) Notice: Subject to any disclaimer, the term of this patent is extended or adjusted under 35 U.S.C. 154(b) by 0 days.

(21) Appl. No.: 13/823,191

(22) PCT Filed: Aug. 24, 2011

(86) PCT No.: PCT/SE2011/000155
§ 371 (c)(1),
(2), (4) Date: Apr. 10, 2013

(87) PCT Pub. No.: WO2012/036606
PCT Pub. Date: Mar. 22, 2012

(65) Prior Publication Data
US 2013/0205700 A1    Aug. 15, 2013

(30) Foreign Application Priority Data

Sep. 14, 2010   (SE) ...................................... 1000937

(51) Int. Cl.
*E04B 1/74*   (2006.01)
(52) U.S. Cl.
USPC .......... 52/404.1; 52/267; 52/302.1; 52/783.1; 52/796.1
(58) Field of Classification Search
USPC ............... 52/267–270, 302.1, 302.3, 404.1, 52/406.1, 407.5, 783.1, 796.1
See application file for complete search history.

(56) References Cited

U.S. PATENT DOCUMENTS

| | | | |
|---|---|---|---|
| 4,054,124 A | 10/1977 | Knoos | |
| 4,262,657 A | 4/1981 | McCullough et al. | |
| 4,908,166 A | 3/1990 | Salyer | |
| 4,924,935 A | 5/1990 | Van Winckel | |
| 5,626,936 A * | 5/1997 | Alderman | 428/68 |
| 5,770,295 A * | 6/1998 | Alderman | 428/68 |
| 6,645,598 B2 * | 11/2003 | Alderman | 428/69 |
| 6,666,044 B2 * | 12/2003 | Gagnon | 62/438 |
| 6,739,097 B1 | 5/2004 | Rodin | |
| 7,694,672 B2 | 4/2010 | Christensen | |
| 7,805,901 B2 * | 10/2010 | Yamada et al. | 52/406.2 |

(Continued)

FOREIGN PATENT DOCUMENTS

| DE | 103 05 431 A1 | 8/2004 |
|---|---|---|
| DE | 10 2004 017 325 A1 | 10/2005 |

(Continued)

OTHER PUBLICATIONS

International Search Report, dated Dec. 16, 2011, from corresponding PCT application.

*Primary Examiner* — Brian Glessner
*Assistant Examiner* — Brian D Mattei
(74) *Attorney, Agent, or Firm* — Young & Thompson

(57) ABSTRACT

A construction material for climate envelopes including floor, walls, roof, windows and case moldings with outer layer made of wood with a surface layer with endothermic effect, insulating material with a surface layer of metal, an air gap for air circulation inside the material and out towards adjacent rooms through intake air from floor space, spaces enclosing a PCM material with a surface layer of metal to heat and cool the house, heat water, heat and refrigerate food. The climate envelope contains solar collectors when glass is substituted for the exterior layer of wood and has the shape of a cuboid or prism for transport and storage of energy. The climate envelope may be produced by that people not skilled in the art assembles a construction kit having an area of 15 square meters and which consitutes a home module, and wherein several modules can make up larger building.

20 Claims, 1 Drawing Sheet

(56) References Cited

U.S. PATENT DOCUMENTS

| | | | |
|---|---|---|---|
| 2003/0061776 A1* | 4/2003 | Alderman | 52/404.1 |
| 2003/0129330 A1* | 7/2003 | Alderman | 428/34.1 |
| 2003/0150237 A1* | 8/2003 | Gagnon | 62/438 |
| 2005/0061312 A1* | 3/2005 | Szymocha | 126/643 |
| 2007/0148379 A1* | 6/2007 | Theios et al. | 428/34 |
| 2008/0061189 A1* | 3/2008 | Schoke | 244/129.2 |
| 2008/0164333 A1 | 7/2008 | Engwall et al. | |
| 2011/0292488 A1* | 12/2011 | McCarthy et al. | 359/265 |

FOREIGN PATENT DOCUMENTS

| | | |
|---|---|---|
| DE | 10 2006 020 535 A1 | 11/2006 |
| DE | 10 2006 029 597 A1 | 1/2007 |
| DE | 20 2006 001 051 U1 | 5/2007 |
| DK | 174935 B1 | 3/2004 |
| EP | 1 446 538 B1 | 8/2004 |
| EP | 2 133 633 A1 | 12/2009 |
| FR | 2 500 036 A1 | 8/1982 |
| GB | 2 214 710 A | 9/1989 |
| SE | 468 057 B | 10/1992 |
| SE | 514 680 C2 | 4/2001 |
| WO | 85/00212 A1 | 1/1985 |
| WO | 20061128565 A1 | 12/2006 |
| WO | 20081105733 A1 | 9/2008 |

* cited by examiner

CLIMATE POSITIVE BUILDING ENVELOPE FOR HOUSING

FIELD OF INVENTION

The present invention relates to a construction material for a climate envelope for a building and a climate envelope with an outer layer of wood which insulates, heats, cools and ventilates a building. The invention also relates to methods for producing smaller climate envelopes for housing, which can be assembled into a bigger building.

BACKGROUND TO THE INVENTION

The climate envelope is the exterior shell of the building i.e. walls, floor and roof. Windows and exterior doors are also included in the climate envelope. Heat dissipates through windows and doors, walls, roof, floor and basement as well as through ventilation. Buildings should be designed such that energy consumption is reduced through low loss of heat, low need for cooling, efficient use of heating and cooling as well as reduced $CO_2$ emissions. The recommended thickness of insulation in cold climates for both new buildings and retrofit insulation is 30-50 cm for walls, 40-50 cm for roofs, and minimum of 30 cm for floors (according to the Swedish Energy Agency). There are several disadvantages to this.

A considerable increased thickness of insulation inside reduces the living space up to 10%, alternatively the cost per square meter with retrofit or original exterior insulation will increase. Thermal bridges, a poorly insulated envelope, are usually due to leaking window trim, doors, spaces between stories, eaves of the roof, and exterior corners of the climate envelope. Thermal bridges causes heat losses and cold surfaces indoors. The insulating capacity of wood is 8 times that of a concrete beam which is 6 times heavier. One cubic meter of wood reduces $CO_2$ emissions about 1.1 tons and stores 0.9 ton (Mitthögskolan, Gustavsson). Cement and concrete account for 4-5% of total global $CO_2$ emissions. Houses built of solid wood with a very long life span are built on a small scale. A well insulated energy efficient climate envelope with solar thermal collectors and panels is a climate positive climate envelope.

Construction technique for sealing houses is costly. The risk for damp damage increases if walls are thicker than 20 cm. A thicker, harder exterior shell is often avoided to reduce the risk for damp penetration (IVA, seminarium Trähusbyggande, 2009, professor KTH). Thin insulation, e.g. 3 cm insulation, exists, which corresponds to 21 cm mineral wool insulation according to independent testing institute. Traditional methods using bulky insulation are most common. Sealed houses require good ventilation and heat exchangers which recycle heat from exhaust air. Ventilation, air conditioning and heating systems available on the market for residential houses, apartments, commercial spaces and buildings are complex and most fresh air intake and air conditioning occurs from above. Hot water is stored at high temperatures, with high cost of energy as a consequence. Solar panels and collectors are developed for use during the warm part of the year, pointing south, east and west and during the sunniest period, and there is a risk of producing an excess of heat energy which in turn requires a need for heat storage e.g. extra accumulator tanks for hot water. Often the indoor temperature is too high. During the cold season too little heat is produced since solar panels, solar collectors, are too small. In hot climates, in warm countries, energy is spent on cooling.

Energy spent on ventilation can be reduced by half compared to fresh air intake from above. Computer simulations of air movements around heat sources in a room shows that heat rises naturally towards the ceiling. Cool fresh air from intake below automatically find its way to heat sources, where heat exchange occurs. Research shows how fresh air intake should be managed in order not to disturb the natural heat diffusion from heat sources in the room. Heat exchange can be concentrated to the heat sources in the room in such a way that it is not experienced by a human being as a draft of air. The need for energy can be reduced by half compared to fresh air intake from above. This significant potential to reduce energy consumption has been verified through studies in real buildings (Cho, Awbi, Karimipanah, Blomqvist, Sandberg, Moshfeg) Traditional building methods with cooling elements in the ceiling and fresh air intake from above means increased use of energy and poorer indoor air quality since warm rising impure air mixes with descending cool air, which puts demands on air circulation.

PCM (Phase Change Materials) is a well known technology (Sundberg, Termisk energilagring genom Fasändringsprocesser. Luleå tekniska universitet. Avdelningen för Förnyelsebar energi, 2005.) The process for PCM-technology can be described in two steps. In the first step heat is transferred to the PCM from a surrounding heat source. This happens when the temperature of the heat source is higher than the temperature of the PCM. The heat can for example consist of the heat from a human body or the indoor air heated by the sun. In this step, the PCM acts as a heat reservoir, absorbing the heat and changing phase, e.g. from solid to liquid.

The process implies that the thermal energy of the PCM increases while the opposite goes for the heat source, where the thermal energy drops. In this step something in the vicinity of the PCM is cooled, e.g. the warm human body or the indoor air by the PCM when it goes through its phase change. At the same time, the PCM is charged with heat, heat which is now latent, and is ready to be released. The heat is released from the PCM to a surrounding heat reservoir in the second step, when the temperature of the PCM is higher than the temperature of the heat reservoir.

The heat reservoir may, in this step, be the original heat source which has cooled and/or another receiver in the vicinity of the PCM. The PCM may, in this step, be seen as a heat source and diffuses the stored heat when the temperature of the PCM drops and the PCM goes through a change of phase in the opposite direction, e.g. from liquid to solid. The process implies that the thermal energy of the PCM drops while the opposite is true of the heat reservoir, where the thermal energy increases.

In this step the PCM transfers heat to something in its surrounding, e.g. a chilled human body or cold indoor air, at the same time as the PCM starts cold storage. The PCM has now acquired the ability to absorb heat, if the temperature of something in its surrounding rises, and can in that way again cool something in its surrounding in accordance with step one. The PCM is selected on the basis of the phase change temperature depending on the purpose of the system or product and application.

If the PCM, for example, is designed to provide cooling to people in a home, a phase change temperature below 20 degrees centigrade can be suitable, and if instead it is used for cooling groceries another phase change temperature may be suitable. The amount of PCM used is different depending on the heating and/or cooling capacity it has to meet. The amount of PCM used, corresponding to a certain heating and/or cooling capacity, doesn't necessarily have to consist of a single unit but can be divided into sub-units. There are advantages to splitting the PCM into small units to improve the heat transfer to and from the PCM and the space available for the PCM to be of different sizes.

At the end of the 19th century, PCM that melted/turned solid at 44.4 degrees centigrade was placed in metal cases to store heat in train compartments and in the beginning of the $20^{th}$ century PCM was used to store cold in different train transport applications (Dinçer. och Rosen, 2002). Later, hot plates were developed to enable hotels and restaurants to keep the food hot for the guests and bed warmers to keep patients in hospitals comfortable (Lane, 1983). In the beginning of the 1940-ies PCM for bed warmers (Bowen, 1949) were developed. In 1946 PCM was used in a house to store the energy from a number of solar collectors using a fan system. By using 21 tons of PCM the system could store around 11 MJ of heat (energy).

The LTES-system had the capacity to supply 21 degree heat to the house during periods of up to seven days with cloudy weather, without having to use any other system for heating (Frysinger och Sliwkowski, 1987). A system solution for buildings was patented during the 1960-ies by Telkes, together with Herrick and Etherington at General Electric and was later used in the USA (Bromley och McKay, 1994).

Dow Chemical, with a leading research unit of PCM during the 1970-ies, performed a study, commissioned by the National Science Federation in the USA, of the potential of nearly 20 000 different PCMs. The outcome was that only about one percent of all the investigated PCMs were considered as having the potential for practical applications meriting further studies. These PCM were different congruent melting salt hydrates and organic material (Lane 1983).

During the 1970-ies and 1980-ies several organizations could supply phase change products for solar heat storage. Dow Chemicals had a product which melted/turned solid är 27.2° C. but the product got no traction on the solar heating market. In 1982, Transphase Systems Inc. installed a cold-storage system for commercial and industrial buildings which used PCM salts (Dinçer och Rosen, 2002). PCM technology is used for long and short term storage of heat and cold.

In long term storage the object is to minimize the heat transfer between the PCM and its surrounding, since even a small heat transfer can amount to great losses over a storage cycle. In long term storage it is important to insulate the PCM. Long term storage in this context means months. In short term storage the time span is hours and days. In short term storage the PCM must give off/absorb heat energy quickly and in that way respond more directly to changes in temperature.

Inside buildings, the atmosphere is perceived as comfortable if the temperature varies very little over 24 hours and PCM can be used to give a constant indoor temperature in the building since it is suitable for cooling, and customarily cold is supplied to a room from the ceiling level. PCM can also be integrated into building components—ceilings, walls, floors—or placed as separate units, or in furniture, in order to minimize temperature fluctuations indoors; when the indoor temperature is high the PCM absorbs the heat, and releases it when the temperature drops.

Buildings can thus be erected in a new way; either with active heating/cooling systems, which have lower capacity and/or with smaller massive building components—through their comparatively high intrinsic storage capacity massive building components provide a "slower" more gradual shift of temperature between day and night. PCM is used in floor components (Rubitherm, 2005) and wall components (BASF, 2005).

PCM technology can be integrated with other already existing energy systems, primarily in order to manage the peak load in the energy system, and one application is thermal systems which use PCM to store solar heat. PCM systems are considered feasible in ventilation systems and hot water tank (accumulator tanks) in buildings. There are several demo sites where PCM technology is used in this way. Belusko and Saman at the University of South Australia have developed a solar heat system which uses corrugated iron as a solar collector to heat air. The hot air is then circulated through a distribution system indoors. PCM is connected to the distribution system and is used for heat and cold storage.

The company TEAP has demonstrated a hot water system which uses PCM. The system is dimensioned for detached residential houses. The system used an inorganic salt with a melting point of 58° C. 150 kg PCM was placed in a plastic container before installation inside a 250 l hot water tank. The PCM absorbs heat from a 2.4 kW electric heater until the desired temperature is reached.

When heat is needed cold water is allowed to flow through the water tank before it is conducted to the end user. A test of Standard has been performed by National Association of Testing Authorities of Australia. The test implies that hot water is drawn on several consecutive occasions until the temperature has dropped from the original 75° C. to 45° C. The tests showed that with PCM in the hot water tank, 408.6 l of hot water could be obtained before the temperature of the water had dropped to 45° C. Without PCM, only 230 l of hot water could be drawn. A system such as this can be charged with heat from a solar collector.

Examples of PCM systems which supply heat and cold where needed are relatively few today. It is easy to see advantages to using PCM technology. If PCM technology is used, part of the peak load of a randomly chosen energy system can be supplied. This should mean lower capital expenditure since an energy system dimensioned for a lower peak load can manage with components with lower capacity. For example, smaller cooling systems, pumps, fans etc. Since PCM technology enables storage of heat for later use, the use of the technology will stimulate renewable energy sources, e.g. solar heat.

This is because these energy sources often supply energy when the need for energy is low and by using PCM technology the conditions allow increased use of renewable energy sources, at the expense of fossil energy sources. Today, primarily solid-liquid PCM is used. It has relatively good energy storing capacity, relatively small changes in volume during phase changes, and has phase change temperatures ranges which can be used to keep us human beings comfortable.

WO 85/00212 shows a solar collector system specially developed for direct heating of a house using heat storage from PCM. A PCM changes phase at a certain temperature and thermal energy is stored or transferred, giving heat and/or cold according to the needs. DE102006020535 (A1) concerns a solar system with PCM and a heat pump for heating and cooling. A PCM device is described in WO 85/00212. U.S. Pat. No. 4,908,166 refers to construction materials and PCM. PCM products with different characteristics for buildings can be bought from, for example, BASF and DuPont. U.S. Pat. No. 4,924,935 describes a flat roof/ceiling system where PCM material is used. WO2006128565 is a patent for PCM material. SE08023A-1 concerns a cooling and heating system for buildings based on thermal energy, where a liquid tank is part of walls, ceilings and floors.

It is known that an insulated space under the ground floor in a building can be used for heating, as described in WO2008105733 (A1) US2008164333 (A1), WO2008105733 (A1). There are PCM patents regarding air conditioning in ceilings DE102006029597 (A1). SE-B-

468057 SE514680C2 describes a floor system for heating and cooling. Solar collectors for heating air for ventilation, water and/or as a medium to transfer heat to a heat exchanger is known. FR 2500036 is a simple air solar collector. U.S. Pat. No. 4,054,124 and U.S. Pat. No. 4,262,657 show a more sophisticated solar collector. One common trait is that the back plane of the solar collector panels are insulated to improve the thermal effectiveness of the collector. GB 2 214 710 shows a combination of a solar collector and solar panel for heating. DK 174935 BI has solar collectors and solar cells with a rear side which allows air to pass through.

None of the above patents solve the problem with a climate envelope in its entirety exemplified with environmentally friendly wood technology, thin effective heat storing insulation, PCM, ventilation with fresh air intake from below, minimization of thermal bridges, cost effective solar heating, heat storage and water heating at lower temperature, air cooling, and furthermore, offers a complete cost effective climate positive climate envelope which is easy to assemble.

The majority of climate envelopes for residential buildings are built at the building site with different craftsmen/trades represented or, alternatively, supplied in modules to reduce the time for construction. A technique where a normal buyer can assemble/erect most of the house by him- or herself like furniture, is lacking. Bought as flat packages to be assembled by the buyer. The invention also includes methods to produce climate envelopes for housing with a 15 square meter footprint and up to 3 meters in height, which can be assembled into larger buildings and which are mobile.

In traditional houses there are functional solutions inside to the climate envelope for heating, sleeping, sitting and eating. Technology for keeping groceries refrigerated is known. The disadvantage is that energy is consumed even when the outside temperature is low. In the past, larders with simple cooling/ventilation were standard. Techniques to collapse beds, couches and tables and store groceries at low temperature, heat food in a small area and purify and collect rain water and store water are well known envelope technique applied to caravans, boats and leisure- and hotel buildings. Space in the outer layer of the climate envelope can be used to heat and cool beds, furniture, food and boil water. To integrate parts of this function with the climate envelope can result in better heat efficiency.

Heating and cooling of buildings is the main cause of global greenhouse gas emissions. The use of well insulated, ventilated climate envelopes and renewable energy can reduce emissions. It is difficult to climate insulate, ventilate, store and distribute solar energy efficiently in a building. None of today's traditional climate envelope solutions combine thin effective insulation with PCM to store heat from the sun, and heat and cold from water and air. Climate positive climate envelope material according to the present invention is a thin ventilated thermos-like shell of wood which stores heat from, for example, the sun and cold storage from, for example, the air with good housing function and easy to install. All of the above is based on the present invention.

SUMMARY OF THE INVENTION

The above-mentioned objects are achieved by the present invention as disclosed in this specification.

Thus, it is an object of the present invention to achieve a system with better heat- and cooling efficiency than conventional systems and which also gives a more healthful living environment and efficient insulated housing.

A further object of the present invention is to achieve a cooling and/or heating system for rooms, water, food in a building, which can be operate without requiring electrical energy.

It is a further object of the present invention to present a method of assembly.

Preferred embodiments are set forth in this specification.

DETAILED DESCRIPTION OF PREFERRED EMBODIMENTS OF THE INVENTION

Figure 1:
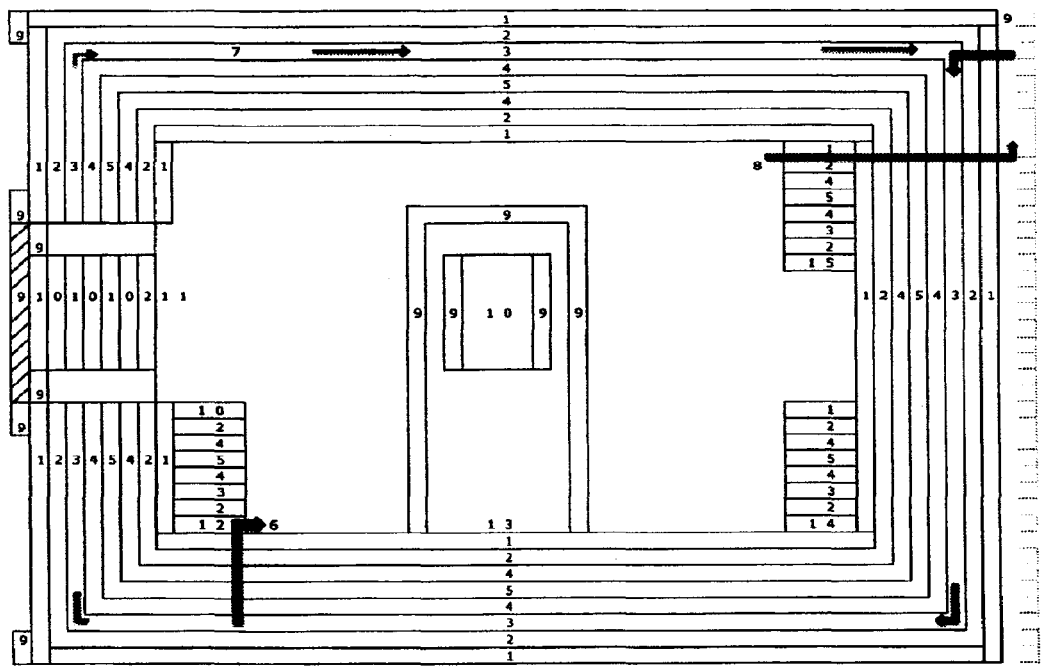
FIG. 1 shows the climate envelope schematically, and
FIG. 2 show characterizing features of the invention
Figure 2:
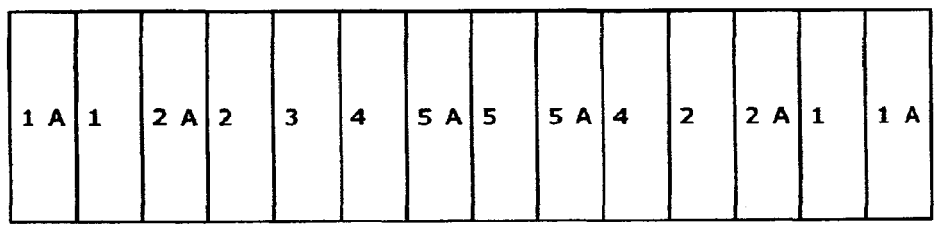

To enable environmentally friendly insulation, cooling, heating of building, materials may be used, in which storage for cold and heat and distribution are integrated as units in the buildings' climate envelopes. Construction materials for climate envelopes for buildings wherein the material includes a first and a second layer, and wherein a plurality of intermediate layers are arranged between the first and second layers, characterized in that the intermediate layer in the direction from the first to the second layer comprises insulating material (2), an air gap (3), an outer space (4), a PCM material (5), an inner space and an additional layer of insulating material (2). FIG. 2.

Construction material for climate envelopes characterized in that said first and second outer layers are made of wood (1) with a surface layer with endothermic effect (1A), that the insulating material is high performance exemplified with heat conductivity in the range of 0.005-0.012 W/(m·K) with insulation thickness 25-70 mm, that insulating material (2) is enclosed by metal (2A), that the PCM material (5) is enclosed by metal (5A), and that the outer space may contain air, liquid or solid material and a combination of these.

Climate envelope for buildings comprising construction materials characterized in that the climate envelope is an essentially closed space with an exterior and an interior and comprising walls, floor, roof, doors and windows and window/door casing which comprises the mentioned construction materials. Air gap (3) is self circulating (7) if cooler fresh air is heated under the floor in sufficient quantity. Inner and outer wooden layers have a ceramic surface layer with several physical characteristics. The scientific term for these is surface layers with endothermic effect. With the endothermic effect the heat loss in the building is reduced and can contribute to savings on heating costs with 12-24 percent. 0.3 mm surface layer contains 12-20 million marbles/m$^2$ which reflect and spread short wavelength visible heat radiation.

The climate envelope enables air to circulate inside the material and out towards adjacent rooms through fresh air intake from the floor space (6) through the exhaust air channel (8). Fresh air intake vent, heat and cooling systems are in the floor, which contains PCM material with phase change temperature in the range of 19 to 23 degrees C. where cool night air can be used to provide comfort cooling. The fresh air intake entering the room doesn't have to be warmer than 19 degrees during winter and never cooler than 22 degrees in rooms with a heat surplus. Cooling of air using air conditioning is therefore not necessary in a country like Sweden. At more temperate latitudes where night air is cool, PCM may be cooled at night with a fan in order to significantly lower daytime indoor temperatures. The movement of air in the floor is relatively slow and dirt and other impurities which come with the fresh air intake, will settle under the air space under the floor. Baseboard moulding and floors are loose to enable cleaning when needed.

The air in the floor space changes temperature through the PCM and mechanically canalized outdoor air through mechanical valves and, when needed, canalized solar heat and from heat pump and fresh air intake fan. The air which is heated or cooled can be exterior air, air from inside the building or a combination of both. Air is delivered to the floor as intake air through a baseboard moulding (6) through an air gap in the wooden floor which contracts and expands depending on the natural movement in the wood, depending on the degree of dampness and/or if the wooden floor is flush or not against the wall in the baseboard, which contains both PCM enclosed by metal which encloses tubes for liquid for cooling and heating and air intake tubes which can give a high impulse which creates a greater force of flow than the total kinetic energy of the thermal exchanges which take place in the room.

The behavior of the intake air can therefore be predicted and optimized and with the help of high impulse when needed. Fresh intake air with a temperature close to that of the air in the room spreads to people and heat sources from below. In this case the air from below without a draft replaces the upward pointing warmer convection. Intake air in the floor comes into contact with heat or cold emitted by PCM and hence changes temperature before it diffuses in the floor space and the room. The heated air will thereby be distributed to the building through an air gap between the wooden floor and the wall and through the PCM baseboard moulding. The baseboard can be equipped either with PCM against the outside wall for heat or cold storage or with an aluminum plate with a copper tube, through which heat and cold can be distributed.

The floor is well insulated against the foundation below. The air is heated or cooled by PCM heat and the air rises against the bottom side of the floor, thereby heating the floor. Through the baseboard moulding and the inclined metal plate the heat is both stored and directs the flow of air towards the center of the floor. The air can circulate in air gaps in the floor, walls and ceiling in the building and return down to the floor and to a heat exchanger. Natural heat like solar energy can be stored in PCM for heating and cold sources, and chilly night air can be used for cold storage. PCM is integrated in floors as described above and in walls and ceilings. Due to the high thermal mass of PCM the effects of temperature fluctuations in surroundings on indoor temperature can be minimized. PCM can be very effective at cooling and heating with cold and heat storage in ceilings and walls. Heat below floors is used to pre-heat intake air from outside which flows in from ceiling level the climate envelope in the self circulating air gap in the building.

The climate envelope is equipped with outside and inside case mouldings (9) containing said climate envelope material. The mouldings insulate places where traditional insulating techniques can be insufficient. Innercasings is air and liquid carried with aluminumcasings covering a copper tube. Thermal bridges in window casing, doors, between stories, in the eaves of the ceiling and exterior corners is mimimized. The climate envelope comprises sliding windows (11) and sliding door (13). Windows comprises inside insulating curtain with good insulating capacity, magnetic seams and Velcro for effective sealing of window and door casing as well as exterior insulated window shutters.

Windows (10) comprises double or triple glazed window panes (10). For fixed windows, the glass is mounted in the window frame. For windows that open, a window sash is mounted in the window frame. Outside and inside glass is mounted by removing a part of the outer and inner wooden layers. Outside metal layers can be covered with "thin film" to improve absorption and emission and comprises a copper tube to transfer energy. Windows may be equipped with shades made of insulating material as disclosed in this specification, adjustable horizontal shutters with louvers that may be vertically adjusted.

Window shutters may contain casing and solar panel with solar cells for operation and battery. The window shutters insulate the windows when they are shut. When they are open they may be pointed in the direction of the sun mechanically. The blinds may be equipped with an automatic computer controlled sun powered motor which automatically adjusts the position of windows and louvers. The program is based on longitude and latitude positioning. The mechanism is pinch-proof, which means that the motor stops if a finger is in the way. The window blinds outside and inside consists of tempered glass often with low iron content, and insulated frame with PCM and copper tubes.

The window may be connected with tubes in order to transfer liquid or solid media. The pump or fan is controlled by a thermostat. When the difference in temperature reaches a predetermined value the pump fills the copper tubes between the panes of glass. The PCM walls or roof can capture a great deal of the solar radiation if part of the exterior wooden layer is replaced with glass and connected through the exterior insulation by, for example, copper tubes enclosed by the metal layer. The underlying metal works as an absorber and heat may be transferred to the PCM through tubes with heated air or heated liquid media.

In parts of the exterior beading, the first wooden layer of material is replaced by glass where adjacent metal encloses a metal tube which may contain air or liquid, and is covered with thin film to be able to absorb as much as possible of the solar energy. Vertical exterior beadings and mouldings are combined solar collectors for air and liquid media in copper tubes enclosed by a coated aluminum sheet. The climate envelope contains a solar based system with windows, doors, corner and roof casing, where all layers are glass, instead of wood. Horizontal case mouldings are solar cell panels and solar collectors with liquid media. The windows comprises solar collectors with above specified material layer. Case mouldings may be of varying width. The width 7.5 och 15 cm consist of an aluminum sheet which encloses a copper tube. The sheet is covered with a thin film based on nano technology. The product may be sourced from suppliers to solar panel manufacturers. The copper tube in this invention may be used for either pre-heating air or conducting water or other liquid media for heat storage in PCM which changes phase at high temperatures. Case mouldings contains a thin insulating layer.

Sun on wall is an application of PCM for thermal storage. The wall consists of the construction materials' different layers. Solar radiation which reaches the wall is absorbed by PCM and is stored in the wall through an integrated solar panel in windows and case mouldings. The stored heat is used for heating and ventilation in a house. The ventilation air is heated in the outer space which is an air vent which leads to the room through the space below the floor.

Walls may offer climate envelope space to purify and store water, heat water and heat foodstuffs, cool food and store and purify air. The climate envelope has a defined part of the interior space in the wall which enables storage of heat in PCM material in order to heat material in outer or inner space such as a collapsible bed. The climate envelope has a defined part of the above mentioned inner space in the walls which enables air circulation through temperature controlled air intake fan and PCM material with low phase change temperature of, for example, 7 degrees C. to refrigerate food (14). The climate envelope further has the inner space in the wall which enables heat storage in PCM material with high phase change temperature of, for example, 58 degrees C. in order to heat a flow of cool water (15). The PCM tank is made of acid proof steel with interior coiled tubes made of acid proof steel both for heating of PCM and for direct heating of cold water.

Cold water can be pre-heated by using the interior temperature through tubes in the baseboard moulding and ceiling moulding and is collected above the PCM tank in a cold water tank with two compartments; one for storing filtered rain water and fresh drinking water in the other. A cold water tank and a PCM tank is placed above the kitchen sink in a PCM cabinet integrated in the wall with shelves and mesh for air circulation and water drain from sink (risk of water leaks) and an additional cold water tank and PCM tank in the wall of a compact shower space with WC and sink.

Shower basin consisting of copper tubes and aluminum to recycle hot shower water by pre-heating water/intake air and separate ventilation. A simple sprinkler system is connected to WC and the rain water tank in the wall. In a PCM closet integrated in a wall there is an air purifier in the lower part which collects and purifies the air in the room through a vent on the front. The closet contains four air vents connected to the countertop surface and one in the top edge for exhaust and two where the PCM is. In the lower part of the wall integrated kitchen sink is a well insulated cold space (14) with a valve on the top and bottom edges which may be opened and closed, and a temperature and time controlled fan. This PCM has a low phase change temperature of around 7 degrees C.

A wall integrated stove and oven cabinet, with its own exhaust air (12) contains PCM which changes phase at a high temperature. The oven contains copper tubes and aluminum sheet which may be directly connected to solar collectors in order to generate high temperature. The stove cabinet is placed pointing south in a wall with a window which can be opened. The stove consists of a box with walls and a bottom with solar collectors which can be covered with a transparent cover, surrounded by one or several extractable reflectors which concentrate sunlight into the box where the cooking vessel is placed.

The climate envelope has a window sill where the first layer of glass is removable and where the space behind is shaped in such a way that walls, floor work as solar collectors and as hotplates and above mentioned glass sealed window box is surrounded by one or several reflecting curtains with insulating material which concentrate the sunlight into the box where the cooking vessels may be placed, that exterior and interior space is enclosed by metal and adjacent metal encloses a metal tube which may contain air or liquid, that the PCM material has a high phase change temperature to heat and keep food hot.

Construction kit is a collection of construction components where floor, walls and roof parts which when correctly assembled into modular elements may work as corresponding climate envelope as assembled by supplier. By assembling modules, it is possible for two persons, which are not persons skilled in the art, to prepare surface treatment, installations and interiors on a flat small ground surface. At the building site, after transportation if any, the modules are assembled on a foundation and are completed into a complete building. A building may consist of one up to sixteen modules depending on size and floor plan, volume modules for buildings up to two stories. The foundation is flat hard ground flattened out with gravel for a draining bed of gravel and insulation, alternatively plinths of stone or concrete.

In addition to residential houses, the same modules can be used for offices, school and hotels since the functionality is built into the climate envelope and the range of use may easily be modified over time. The building structure in a module is massive wood. The volume modules are quickly assembled since the superstructure may be erected at the same time as the foundation. This increases the possibility to save time and improve quality monitoring. The mobility is great since the buildings may be taken apart to separate modules again. The mobility makes it possibility to rent out buildings during a certain period.

Construction kits includes cuboids and prisms. Cuboids are defined of six rectangular side surfaces, eight corners and twelve edges. The cuboids measurements are 2750 mm wide, 5500 mm long and 2750 mm high, alternatively 3000 mm long, 5000 mm long 2800 mm high. A bigger cuboid 5500 mm wide, 11000 mm long and 5500 mm high is assembled by using 4 of the first category in the ground floor and another 4 in the first floor. Of the other category bigger cuboid measuring 6000 mm wide and 20000 mm long and 6000 mm high can be assembled using 18 cuboids of 8 cuboids of the second category in the ground floor and 8 cuboids at the first floor. The prisms have pentagonal surfaces which is about 15 square meters. The sides are 4500 mm long, 3500 mm, 2500 mm and around 1000 mm and height 6000 mm. 16 prisms make up a climate envelop with 8 prisms in the ground floor.

A cuboid construction kit consists of a 60 meter glulam beam 90*90*5000 mm for the structure and 60 massive wooden boards 28*2460*600 for exterior and inner walls. The wooden roof is 42 mm thick for 15 square meters. Wood surface paint. Metal insulating foil 2*66 square meters. Iron sheet roof. PCM, windows, doors, solar panel, hot water heater, air heat exchanger, electricity and water and sewage kits, shower and WC cabinet, mini-kitchen.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A construction material for a climate envelope of a building comprising:
   a first outer layer, directed to an outside of the building,
   a second inner layer, directed to an inside of the building,
   a plurality of intermediate layers arranged between the first outer layer and the second inner layer,
   wherein said intermediate layer, in a direction from the outside of the building towards the inside of the building, comprises an
   i) insulating material (2),
   ii) an air gap (3),
   iii) an outer space (4) filled with at least one of air, liquid, and solid material,
   iv) a PCM material (5),
   v) an inner space (4) filled with at least one of air, liquid, and solid material, and
   vi) an additional layer of insulating material (2), and
   an air intake (6), and
   an exhaust air channel (8), the air intake (6) and exhaust air channel (8) enabling air circulation in a continuous path through said construction material in through said air intake (6), via said air gap (3), and out through said exhaust air channel (8).

2. A construction material for a climate envelope according to claim 1, wherein, said first outer layer and said second inner layer are made of wood (1) with a ceramic surface layer (1A),
the insulating material (2) is enclosed by metal (2A), and
the PCM material (5) is enclosed by metal (5A).

3. A construction material for a climate envelope according to claim 2 wherein a first defined part of said inner space in a wall enables heating of material in the inner space and a second defined part of the inner space in the wall enables air circulation through the PCM material with a low phase change temperature of a maximum of 7° C. in order to refrigerate food.

4. A construction material for a climate envelope according to claim 2, wherein a defined part of said inner space in a wall enables storage of solar heat in said PCM material with a high phase change temperature of at least 58° C. in order to heat a flow of cool water.

5. A construction material for a climate envelope according to claim 2, wherein said ceramic surface layer (1A) contains 12-20 million marbles/m² per 0.3 mm surface area.

6. A construction material for a climate envelope according to claim 1, wherein said PCM material has a phase change temperature in the range of 19 to 23° C.

7. A construction material for a climate envelope according to claim 6, wherein the first outer layer comprises glass to enable solar collector function.

8. A construction material for a climate envelope according to claim 1, wherein the first outer layer comprises glass to enable solar collector function.

9. A construction material for a climate envelope according to claim 1 wherein, the construction material defines an exterior wall of a building with a first defined part of said inner space that enables heating of material in the inner space and a second defined part of the inner space that enables air circulation through the PCM material with a low phase change temperature of a maximum of 7° C. in order to refrigerate, food.

10. A construction material for a climate envelope according to claim 1, wherein a defined part of said inner space in a wall enables storage of solar heat in said PCM material with a high phase change temperature of at least 58° C. in order to heat a flow of cool water.

11. A climate envelope for a building comprising construction material according to claim 1, wherein the climate envelope defines walls, floor, roof, doors, windows, window shutters and window case mouldings of a building.

12. A construction material for a climate envelope according to claim 1, wherein said insulating material (2) has a heat conductivity in the range of 0.005-0.012 W/(m·K) and a thickness of 25-70 mm.

13. A construction material for a climate envelope according to claim 1, wherein,
wherein the construction material is arranged as plural rooms of a building and a floor space,
the air intake (6) receives heated air from the floor space in a first room,
the air gap (3) is a self-circulating air gap (3) that receives the heated air through the air intake (6), and
the exhaust air channel (8) has an outlet that exhaust into a second room.

14. A construction material for a climate envelope according to claim 1, wherein,
the construction material defines an exterior wall of a building, and
the first outer layer comprises wood with an exterior facing ceramic surface layer (1A), where the ceramic surface layer provides an endothermic effect.

15. A construction material for a climate envelope according to claim 1, wherein,
the construction material defines an exterior wall of a building and the first outer layer comprises glass.

16. A construction material for a climate envelope according to claim 1, wherein,
the construction material defines an exterior wall of a building,
in a first region the first outer layer comprises wood with an exterior facing ceramic surface layer (1A) that provides an endothermic effect, and
in a second region the first out layer comprises glass.

17. A construction material for a climate envelope according to claim 1, wherein,
the construction material defines an exterior wall of a building,
the first outer layer comprises glass that serves as a solar collector, and
the second inner layer includes an air exhaust comprised of further PCM material.

18. A construction material for a climate envelope according to claim 1, wherein the construction material defines an exterior wall of a building with i) a first defined part of said inner space that enables heating of material in the inner space and ii) a second defined part that enables air circulation through the PCM material with a low phase change temperature for refrigerating food.

19. A construction material for a climate envelope of a building according to claim 1, wherein said construction material defines an exterior wall of a building.

20. A construction material for a climate envelope according to claim 19, wherein,
wherein the construction material further defines plural rooms of the building and a floor space of the building,
the air intake (6) receives heated air from the floor space,
the air gap (3) is a self-circulating air gap (3) that receives the heated air through the air intake (6), and
the exhaust air channel (8) has an outlet that exhaust into one of the rooms.

* * * * *